United States Patent [19]

Buchholz et al.

[11] Patent Number: 4,611,633

[45] Date of Patent: Sep. 16, 1986

[54] EXPANSION HOSE FOR REDUCTION OF PRESSURE PULSATIONS

[75] Inventors: Peter Buchholz, Gifhorn; Claus-Peter Schöpke, Wasbüttel; Rolf Warnecke, Gifhorn, all of Fed. Rep. of Germany

[73] Assignee: Volkswagenwerk Aktiengesellschaft, Wolfsburg, Fed. Rep. of Germany

[21] Appl. No.: 667,540

[22] Filed: Nov. 2, 1984

[30] Foreign Application Priority Data

Nov. 4, 1983 [DE] Fed. Rep. of Germany ....... 3339876

[51] Int. Cl.$^4$ ............................................. F16L 55/04
[52] U.S. Cl. ...................................... 138/26; 181/255; 417/540
[58] Field of Search ................. 138/26; 181/223, 227, 181/255; 417/540

[56] References Cited

U.S. PATENT DOCUMENTS

| 260,217 | 6/1882 | McGauflin | 138/26 X |
| 696,277 | 3/1902 | Sponseller et al. | 138/26 |
| 2,213,614 | 9/1940 | Scorritt | 181/255 |
| 3,480,105 | 11/1969 | Burris | 181/255 |

FOREIGN PATENT DOCUMENTS

| 998338 | 1/1952 | France | 138/26 |
| 391346 | 11/1973 | U.S.S.R. | 138/26 |
| 958760 | 9/1982 | U.S.S.R. | 138/26 |

*Primary Examiner*—James E. Bryant, III
*Attorney, Agent, or Firm*—Brumbaugh, Graves, Donohue & Raymond

[57] ABSTRACT

An expansion hose having a central internal throttle element dividing the interior of the hose into two chambers, and an internal hose extending from the expansion hose inlet through one of the chambers and the throttle element into the second chamber. The portion of the inner hose within the first chamber has radial throttle passages, and the portion within the second chamber is imperforate.

1 Claim, 1 Drawing Figure

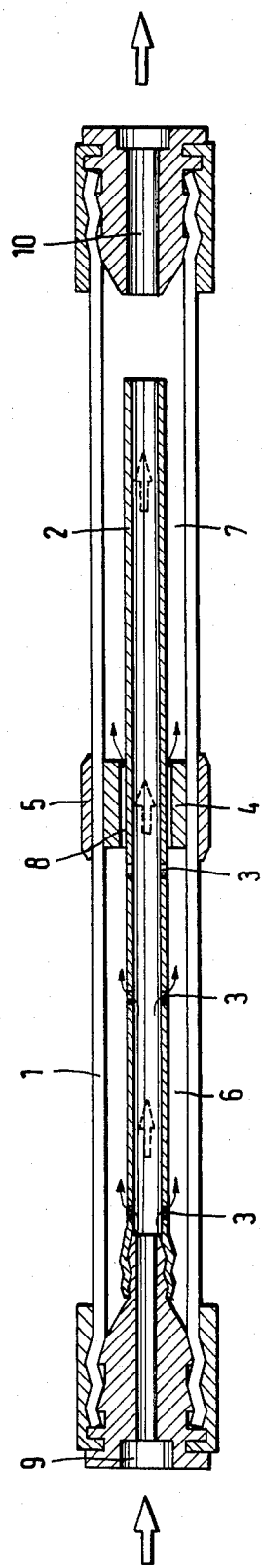

EXPANSION HOSE FOR REDUCTION OF PRESSURE PULSATIONS

BACKGROUND OF THE INVENTION

This invention relates to expansion hoses and, more particularly, to a new and improved expansion hose especially adapted to inhibit hydraulic pressure pulsations.

Expansion hoses designed to reduce pulsations in hydraulic pressure are used in hydraulic circuits such as those in the power steering mechanism of an automobile. In order to reduce pressure pulsations caused by hydraulic pumps, and the humming noises connected therewith, conventional expansion hoses are composed of a material which is expandable within certain limits so that, upon increase of the working pressure of the pressure medium flowing through the hose, the hose wall can expand correspondingly. Thus, corresponding variations in the interior volume of the hose will occur as a function of the prevailing working pressure so that pressure pulsations at the outlet and the expansion hose are noticeably smaller than the pulsations at the inlet side of the expansion hose.

The extent of the pulsation reduction depends, among other things, upon the internal volume of the hose, i.e. its cross section and length, as well as the expandability of the hose material. In view of the conventional working pressures, on the one hand, and the space available to accommodate the expansion hose, on the other hand, however, the cross section and length of the hose must be limited.

In order to achieve an improved pulsation reduction in spite of these limitations, an expansion hose has been provided with a throttle element approximately at the center of the hose, the throttle element having an axial throttle passage so that the hose interior is divided into two hose chambers connected with each other by the throttle passage.

It is also known to provide an inner hose having radial throttle passages in the interior of the expansion hose in place of a throttle element, one end of the inner hose being connected with the hose inlet to reduce pulsations, the other end opening freely into the interior of the expansion hose. Thus, the hydraulic fluid flows by way of the inner hose into the interior of the expansion hose so that part of the hydraulic fluid emerges through the radial passages of the inner hose and another part flows through to the end of the inner hose. As with the use of the center throttle element, the use of an inner hose results in some reduction of the pressure pulsation.

In many cases, such as in power steering mechanisms of automobiles, such an expansion hose is inserted as a connecting line between the hydraulic pump and the power steering gear. Nevertheless the pressure pulsation, even though decreased by the use of expansion hoses modified in this manner, still causes reduced riding comfort.

Accordingly, it is an object of the present invention to provide an improved expansion hose which effectively overcomes the disadvantages of the prior art.

Another object of the invention is to provide an expansion hose by which a clearly perceptible reduction of the pressure pulsation is effected without the need to increase the overall hose dimensions or the internal hose volume.

BRIEF SUMMARY OF THE INVENTION

These and other objects of the invention are attained by providing an expansion hose having an internal throttle element dividing the interior of the hose into two chambers and an inner hose connected at one end with the expansion hose inlet and passing through one of the hose chambers and the internal throttle element into the other hose chamber, the internal hose being formed with radial throttle passages within only the first of the two chambers.

BRIEF DESCRIPTION OF THE DRAWING

Further objects and advantages of the invention will be apparent from a reading of the following description in conjunction with the sole figure of the accompanying drawing, which is a view in longitudinal section illustrating a representative expansion hose arranged according to the invention.

DESCRIPTION OF PREFERRED EMBODIMENT

The typical expansion hose illustrated in the drawing includes a conventional pressure hose made of a material which yields within limits and thus produces changes in internal volume as a function of the applied pressure of the hydraulic medium. In the interior of the hose, a throttle element 4 is installed at approximately the midpoint of the hose, the throttle element being provided with an axial throttle passage 8. In the illustrated embodiment, the throttle element is fixed in place by a compression device such as a hose clip gripping the pressure hose 1. The throttle element 4 divides the expansion hose into a first hose chamber 6 on the inlet side and a second hose chamber 7 on the outlet side.

In addition, an inner hose 2 is arranged in the interior of the pressure hose 1 and one of its ends is connected directly with a hose inlet 9 of the expansion hose. The inner hose 2 which may, for example, be a polyamide tube or a steel braid hose, extends through the first hose chamber 6 and the throttle element 4 into the second hose chamber 7 where it terminates with an open end.

The portion of the inner hose 2 within the region of the first hose chamber 6, and only in that region, is provided with a plurality of very small radial throttle passages 3. In addition, the portion of the inner hose 2 within the region of the second hose chamber 7 has an imperforate wall. Because of the flow resistance prevailing in the inner hose 2, the hydraulic medium entering the hose inlet 9 is divided into a first hydraulic current flowing through the inner hose 2 directly into the second hose chamber 7 and a second hydraulic current flowing through the radial throttle passages 3 into the first hose chamber 6. The second hydraulic current subsequently passes into the second hose chamber 7 by way of the axial annular throttle passage 8. The hydraulic medium finally passes through the hose outlet 10 into the hydraulic circuit proper, for example, the hydraulic power steering mechanism of an automobile.

As a result of the aforementioned flow resistance in the inner hose 2, the first hydrualic current arrives in the second hose chamber 7 with a phase shift relative to the second hydraulic current in the first hose chamber 6.

Consequently, if the hydraulic medium does not flow through the expansion hose as a uniform current with a truly constant working pressure but instead produces pressure and volume pulsations, respectively, such as is generally the case if the hydraulic medium is conveyed by a pump such as a vane pump or the like, reciprocal pressure and volume variations occur in the two hose chambers 6 and 7 as a result of these conditions. As a result, pressure or volume interchanges between those hose chambers 6 and 7 can take place through the annular axial throttle passage 8 which causes the pressure and volume pulsation, respectively, of the pressure medium leaving the expansion hose through the hose outlet 10 to be substantially reduced.

Considering the hose length, cross-section and expandability and the working pressure as being fixed for each particular application, the degree of pulsation reduction will depend upon the dimensions of the inner hose 2, i.e., the flow cross section and the length, and the throttle cross section of the radial throttle passages 3 as well as of the axial throttle passage 8. When these quantities are properly coordinated, it is possible to achieve a nearly pulsation-free hydraulic flow with the use of the expansion hose in accordance with the invention.

We claim:

1. In a hydraulic circuit an expansion hose for reducing pressure pulsations, the expansion hose comprising: an outer hose having a first hose chamber on an inlet side with an inlet end adapted to receive the pressure pulsations from the hydraulic circuit and a second hose chamber on an outlet side with an outlet end; a throttle element containing an axial throttle passage connecting the first and second chambers; and an inner hose connected at one end with the outer hose inlet end and having a portion extending through the first hose chamber and the throttle element and a portion extending into the second chamber, the inner hose further having its other end open so as to discharge directly into the second hose chamber, the portion of the inner hose within the first hose chamber having at least one radial throttle passage, and the portion of the inner hose within the second hose chamber having an imperforate wall.

* * * * *